United States Patent
Bade et al.

(10) Patent No.: US 10,044,308 B2
(45) Date of Patent: Aug. 7, 2018

(54) DRIVE APPARATUS WITH MOMENT OF INERTIA ESTIMATION

(71) Applicant: SIEMENS AKTIENGESELLSCHAFT, München (DE)

(72) Inventors: Jörn Bade, Möhrendorf (DE); Mihaly Nemeth-Csoka, Erlangen (DE); Michael Neudeck, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/563,173

(22) PCT Filed: Jan. 5, 2016

(86) PCT No.: PCT/EP2016/050058
§ 371 (c)(1),
(2) Date: Sep. 29, 2017

(87) PCT Pub. No.: WO2016/155893
PCT Pub. Date: Oct. 6, 2016

(65) Prior Publication Data
US 2018/0083562 A1  Mar. 22, 2018

(30) Foreign Application Priority Data
Mar. 31, 2015 (EP) .................................. 15161970

(51) Int. Cl.
*H02P 6/06* (2006.01)
*H02P 21/14* (2016.01)
(Continued)

(52) U.S. Cl.
CPC ........ *H02P 21/143* (2013.01); *G05B 13/0245* (2013.01); *G05B 13/042* (2013.01);
(Continued)

(58) Field of Classification Search
CPC ...... H02P 1/00; H02P 3/00; H02P 6/00; H02P 6/06; H02P 21/00; H02P 41/00;
(Continued)

(56) References Cited

U.S. PATENT DOCUMENTS 6,981,221 B2  12/2005  Neudeck
7,047,150 B2  5/2006  Kuenzel et al.
(Continued)

FOREIGN PATENT DOCUMENTS

CN  103338003 A  10/2013
DE  10 2006 062 591  7/2008
(Continued)

OTHER PUBLICATIONS

International Search Report dated Jun. 21, 2016 by the European Patent Office in International Application PCT/EP2016/050058.

*Primary Examiner* — Antony M Paul
(74) *Attorney, Agent, or Firm* — Henry M. Feiereisen LLC

(57) ABSTRACT

A method for operating a controller apparatus for controlling a drive apparatus having a load moment and a moment of inertia, includes determining an estimated load value of the load moment by a load moment estimator during a constant-running phase, when a drive speed of the drive apparatus is kept to a constant setpoint value by the controller apparatus, using a model to describe an association between the moment of inertia and the load moment and generating an estimated inertia value of the moment of inertia as a pilot control of the moment of inertia based on the model during the constant-running phase. Further disclosed are a controller apparatus and a drive apparatus designed to carry out the method.

13 Claims, 3 Drawing Sheets

(51) Int. Cl.
*G05B 13/04* (2006.01)
*G05B 13/02* (2006.01)
*B25J 9/16* (2006.01)

(52) U.S. Cl.
CPC .......... *G05B 13/048* (2013.01); *B25J 9/1638* (2013.01); *G05B 2219/41163* (2013.01)

(58) Field of Classification Search
CPC .......... H02P 27/04; H02P 27/06; H02P 23/00; H02P 25/00; H02P 27/00; G01R 1/14
USPC .......... 73/125, 864.66; 105/72.1; 192/103 C; 303/24.1; 307/121; 310/74; 324/125; 340/429; 74/64; 318/400.01, 700, 721, 318/779, 799, 68, 268, 560, 64, 609, 610
See application file for complete search history.

(56) References Cited

U.S. PATENT DOCUMENTS

| | | | |
|---|---|---|---|
| 7,781,996 B2 * | 8/2010 | Tajima | H02P 23/14 318/268 |
| 8,729,845 B2 | 5/2014 | Künzel et al. | |
| 9,035,589 B2 | 5/2015 | Nemeth-Csoka et al. | |
| 2007/0150076 A1 | 6/2007 | Schmidt et al. | |
| 2010/0185320 A1 | 7/2010 | Nemeth-Csoka et al. | |
| 2011/0234144 A1 | 9/2011 | Maekawa | |
| 2013/0257339 A1 | 10/2013 | Kim | |
| 2013/0278196 A1 | 10/2013 | Tian | |
| 2014/0028224 A1 | 1/2014 | Arima | |
| 2014/0239113 A1 | 8/2014 | Igarashi | |

FOREIGN PATENT DOCUMENTS

| | | |
|---|---|---|
| DE | 10 2011 085 551 | 8/2012 |
| EP | 2 537 789 | 12/2012 |
| JP | H07306111 A | 11/1995 |
| JP | 2011200067 A | 10/2011 |
| JP | 2014027742 A | 2/2014 |
| JP | 2014165987 A | 9/2014 |
| WO | WO 2013158849 A2 | 10/2013 |

* cited by examiner

DRIVE APPARATUS WITH MOMENT OF INERTIA ESTIMATION

CROSS-REFERENCES TO RELATED APPLICATIONS

This application is the U.S. National Stage of International Application No. PCT/EP2016/050058, filed Jan. 5, 2016, which designated the United States and has been published as International Publication No. WO 2016/155893 A1 and which claims the priority of European Patent Application, Serial No. 15161970.7, filed Mar. 31, 2015, pursuant to 35 U.S.C. 119(a)-(d).

BACKGROUND OF THE INVENTION

The invention relates to a method for operating a controller or a controller apparatus for controlling a drive apparatus. The drive apparatus can comprise an electric machine for instance. The invention further comprises the controller apparatus and the drive apparatus.

With rotational speed-controlled or generally speed-controlled drive apparatuses the quality of the control loop, in other words its control accuracy and its dynamic behavior, is heavily dependent on how precisely the section to be controlled is known. One particularly important parameter here is the moment of inertia of the controlled section, in particular the load driven by the drive apparatus. If the moment of inertia changes in an operation-dependent manner and this property cannot be communicated, the quality of the control process suffers. When a modified speed value is set or adjusted, overshooting occurs or the speed setting is slower than with a more precisely estimated moment of inertia.

A moment of inertia estimator for estimating a moment of inertia factor of a motor arrangement of a lift system is known from EP 2 537 789 A2. An estimated inertia value of the moment of inertia is measured here with a periodically modified drive speed of the vehicle. In other words, a dynamic process is required in order to determine the estimated inertia value. If there are changes during a constant-running phase in which the controller apparatus keeps a drive speed of the drive apparatus at a constant setpoint value, in a subsequent acceleration phase there is no current estimated inertia value available.

A further moment of inertia estimator is known from DE 10 2011 085 551 A1. This moment of inertia estimator also requires a rotational speed modification process in order to estimate the moment of inertia.

A load moment estimator of a load moment or load moment of a drive apparatus is known from DE 10 2006 062 591 A1. With the known arrangement, pilot control of the torque is further provided, by means of which a pilot control value for a controller apparatus is determined as a function of a moment of inertia of the drive apparatus and a current load moment.

SUMMARY OF THE INVENTION

The object underlying the invention is to estimate the moment of inertia in the case of a drive apparatus.

The object is achieved by the subject matters of the independent claims. Advantageous developments of the invention result from the features of the dependent claims.

The invention provides a method which is designed to operate a controller apparatus for controlling a drive apparatus. The drive apparatus has a load moment and a moment of inertia. These must be taken into account when controlling a drive speed of the drive apparatus. According to the embodiment of the drive apparatus, drive speed here refers to a rotational speed or a linear speed for instance. With the method, an estimated load value of the load moment is determined by a load moment estimator during a constant-running phase, in which the controller apparatus keeps the drive speed at a constant setpoint value. A load moment estimator which is known per se from the prior art can be used as a load moment estimator, as was described in the introduction for instance. Another possibility of load moment estimation is for instance to determine the driving power during the constant-running phase and to determine the estimated load value as a function of the drive speed and the driving power.

In accordance with the invention a model of the drive apparatus is provided in the method. The model describes an association between the moment of inertia and the load moment. During the constant-running phase, an estimated inertia value of the moment of inertia is provided on the basis of the model. This is referred to below as pilot control of the moment of inertia. The moment of inertia can be calculated during an acceleration, this is prior art. The precalculation of the moment of inertia without acceleration is what makes it novel. This is referred to here as pilot control of the moment of inertia.

The invention is advantageous in that during the constant-running phase and in particular at the end of the constant-running phase, an estimated inertia value is provided, which can be used, in a subsequent acceleration phase, to set the control of the drive speed with a higher quality, in other words dynamics and precision, than would be case if after the constant-running phase at the start of the acceleration phase an estimated inertia value was firstly determined with a moment of inertia estimator known from the prior art. The knowledge underlying the invention is that drive apparatuses exist in which the load moment is significantly dependent on the respective moment of inertia. One example of this is a conveyor belt, as is used for instance in an airport for baggage handling. The more baggage there is on the conveyor belt, the greater the load moment, because friction increases due to the weight of the baggage. At the same time, the same baggage also forms the largest part of the moment of inertia. The quantity or weight of the baggage can be concluded as a function of an estimated load value of the load moment. An estimated inertia value of the moment of inertia can in turn be determined therefrom. Another example is a transport system in a mine, with which rubble or shingle is transported.

With a drive apparatus with a conveyor belt, the friction is dependent on the moment of inertia to be moved.

Developments of the method, by means of which additional advantages result, also form part of the invention.

According to one development, a pilot control of the torque of the controller apparatus is parameterized or set with the estimated inertia value. The pilot control described in the introduction or another pilot control known from the prior art can be provided as a pilot control of the torque. On account of the development, the advantage results that a dynamic behavior of the controller apparatus is improved, in other words a time constant for adjusting a predetermined setpoint value of the drive speed is reduced.

According to one development, an inertia value of the moment of inertia is determined by a dynamic moment of inertia estimator during an acceleration phase, in which the drive speed is adjusted to a new setpoint value by the controller apparatus. The drive speed therefore changes during the acceleration phase. Therefore a moment of inertia estimator which is known per se from the prior art can be used. The difference between the moment of inertia estimator and the cited model is that the moment of inertia estimator determines the inertia value of the moment of inertia on account of a dynamic behavior of the drive apparatus. With the development the model is adapted by means of the inertia value. As a result, it is advantageous that the controller apparatus is self-calibrating or self-adjusting.

According to one development, the estimated inertia value is generated by the model in a manner dependent on the direction of rotation. This has proven to be a particularly advantageous embodiment. It is based on the knowledge that the association between the moment of inertia and the load moment is dependent on the direction of rotation.

According to one development, the model has a linear assignment rule with an offset parameter and a gradient value. In other words the assignment rule is therefore described by a linear equation, wherein the offset parameter and the gradient value can represent or describe a y-axis section or the gradient of the straight line in each case. This embodiment of the model is advantageous in that the model can be adjusted to the drive apparatus with particularly little effort.

One development provides that the model is formed from a number of value pairs during an operation of the drive apparatus. Each value pair here comprises a measured or estimated load value of the load moment and a measured or estimated inertia value of the moment of inertia. As the model is adjusted on the basis of a number of value pairs during operation, this offers the advantage that aging or another structural change in the drive apparatus is also taken into account by the model.

According to one development, the model is iteratively updated on the basis of the value pairs. This is advantageous in that a model is already available on the basis of fewer value pairs. In this way the model can already be used after a short time from the start of the operation.

The invention also comprises a controller apparatus for controlling a drive apparatus, which, in the described manner, has a moment of inertia and a load moment. The controller apparatus has a signal input for receiving a setpoint value and a control output for outputting an actuating signal for setting a drive speed of the drive apparatus. With the inventive controller apparatus, a model of the drive apparatus is provided, by means of which an association between the moment of inertia and the load moment is described. The controller apparatus is designed to carry out an embodiment of the inventive method. The inventive controller apparatus is thus able to provide or use an estimated inertia value of the moment of inertia even during a constant-running phase.

The invention further comprises a drive apparatus. The drive apparatus has a drive machine. The drive machine is in particular an electric machine. The drive machine can however also be an internal combustion engine or a hydraulic machine. The inventive drive apparatus has an embodiment of the inventive controller apparatus, wherein the signal output of the controller apparatus is coupled to a speed setting device in the drive machine. In an electric machine, an inverter can be provided as a speed setting device for instance.

According to one development of the invention, in the case of the drive apparatus the drive machine is coupled to an assembly line or conveyor belt and is designed to drive the assembly line. As already mentioned, the use of a model to determine the moment of inertia as a function of a load moment during a constant-running phase is particularly useful in conjunction with an assembly line.

BRIEF DESCRIPTION OF THE DRAWING

One exemplary embodiment of the invention is described below. To this end.

DETAILED DESCRIPTION OF PREFERRED EMBODIMENTS

The exemplary embodiment explained below is a preferred embodiment of the invention. In the exemplary embodiment the described components of the embodiment each represent individual features of the invention to be considered separately from one another, which each also develop the invention further independently of one another and are thus also to be regarded individually or in a combination other than that shown as a component part of the invention. Furthermore, the embodiment described can also be supplemented by further features of the invention that have already been described.

In the figures, functionally identical elements are denoted by the same reference signs.

Figure 1:
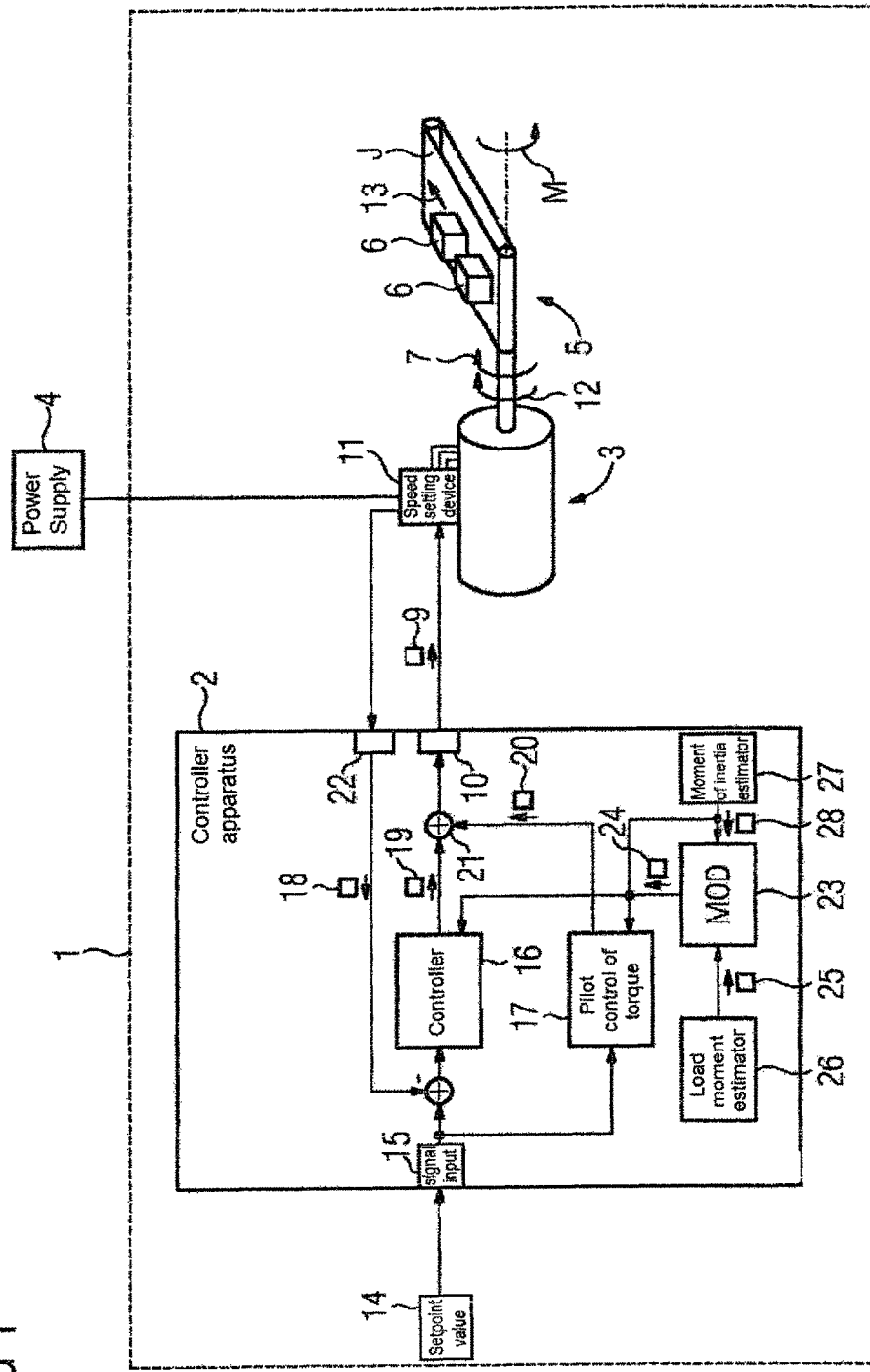
FIG. 1 shows a schematic representation of an embodiment of the inventive drive apparatus.

FIG. 1 shows a drive apparatus 1 of a controller apparatus 2, a drive machine 3, a power supply 4 for the drive machine 3 and a load 5 driven by the drive machine 3. The controller apparatus 2 can be provided by a microcontroller or an ASIC (application-specific integrated circuit) for instance. The drive machine 3 can be an electric machine for instance. In this case the power supply 4 can be an electrical supply network for the drive machine 3, for instance. The load 5 can be an assembly line for instance, on which a changing number and size of items to be transported 6 is transported. In order to drive the load 5, the drive machine 3 generates a driving torque 7, by means of which the load 5 is moved. A load moment M of the load counteracts the driving torque 7. The load moment M is dependent on the number of items to be transported 6. Furthermore, the load 5 has a moment of inertia J, which is likewise dependent on the number and the weight of the items to be transported 6.

The drive machine 3 generates the driving torque 7 as a function of an actuating signal 9, which the controller apparatus 2 outputs to a control output 10. To this end, the control output 10 can be coupled to a speed setting device 11 in the drive machine 3, to which the actuating signal 9 is output. The speed setting device 11 may have an inverter 11 or another motor control device for instance. Electrical energy can be fed from the supply unit 4 into the drive machine 3 by means of the inverter 11. A drive speed 12 of the drive machine 3 is produced as a function of the generated driving torque 7 and the load moment M. A clearing speed 13 of a conveyor belt results for instance on account of the drive speed 12.

The controller apparatus 2 generates the actuating signal 9 as a function of a setpoint value 14, which the controller apparatus 2 receives at a signal input 15. The signal input 15 and the control output 10 can be coupled by way of a controller 16 and a pilot control of the torque 17. The controller 16 can generate a control value 19 as a function of the setpoint value 14 and measured values 18. For instance, the controller 16 may be a PI controller (PI—proportional-integral) or a PID controller (PID—proportional-integral-differential). The pilot control of the torque 17 can generate a pilot value 20. An adder 21 can combine the control value 19 and the pilot value 20 to form the control variable. The resulting actuating signal 9 can in this case predetermine or set the driving torque 7. The measured values 18 can be generated by sensors in the drive machine 3 and/or the load 5 for instance. The measured values 18 can be received at a measured value input 22 by the controller apparatus 2.

With the controller apparatus 2, the pilot control of the torque 17 and/or the controller 16 can be parameterized, adjusted or adapted during an operation of the drive apparatus 1. To this end the controller apparatus 2 has a model 23 (MOD). The model 23 generates estimated inertia values 24 of the moment of inertia J of the load 5. The model 23 generates the estimated inertia values 24 as a function of the estimated load values 25 of the load moment M. The estimated load values 25 are generated in the controller apparatus 2 by a load moment estimator 26. The load moment estimator 26 can be embodied in a manner known per se. The controller apparatus 2 can further have a moment of inertia estimator 27, which estimates inertia values 28 of the moment of inertia J of the load 5 during an acceleration phase of the drive apparatus 1. The moment of inertia estimator 27 can be embodied in a manner known per se. The estimated inertia values 24 are generated by means of the model 23 particularly during a constant-running phase of the drive apparatus 1. This is referred to here as pilot control of the moment of inertia.

During the activation of the pilot control of the moment of inertia, it is assumed that a dependency between the load moment M and moment of inertia J is present on the load 5. A conveyor belt at an airport is mentioned as an example. When the conveyor belt is loaded or unloaded, there is no expectation that there is a change in rotational speed that is sufficient for a reliable moment of inertia identification. Instead, it is expected that a phase with an approximately constant rotational speed follows, in other words a constant-running phase, wherein a load identification is possible. If the assumed dependency is known, the moment of inertia J can be calculated without an acceleration phase.

Figure 2:
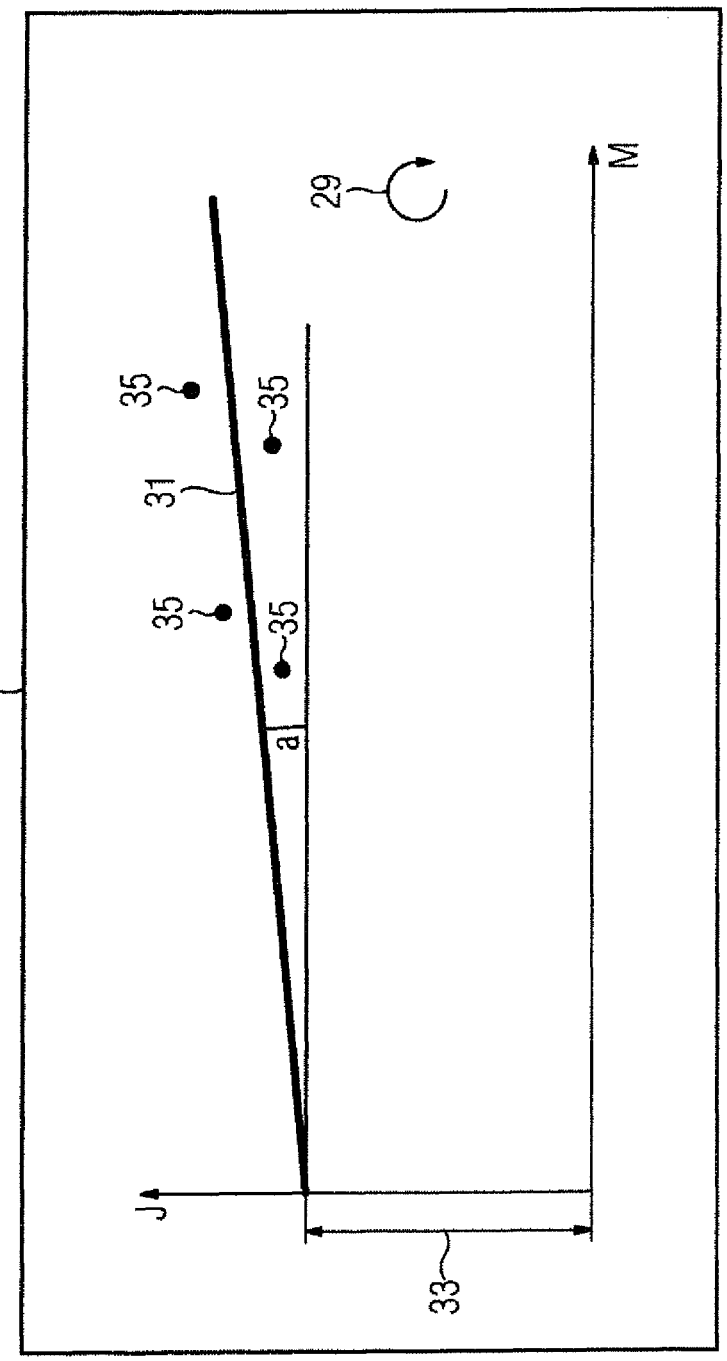
FIG. 2 shows a schematic representation of a model provided in the drive apparatus in FIG. 1 for a first rotational direction.
Figure 3:
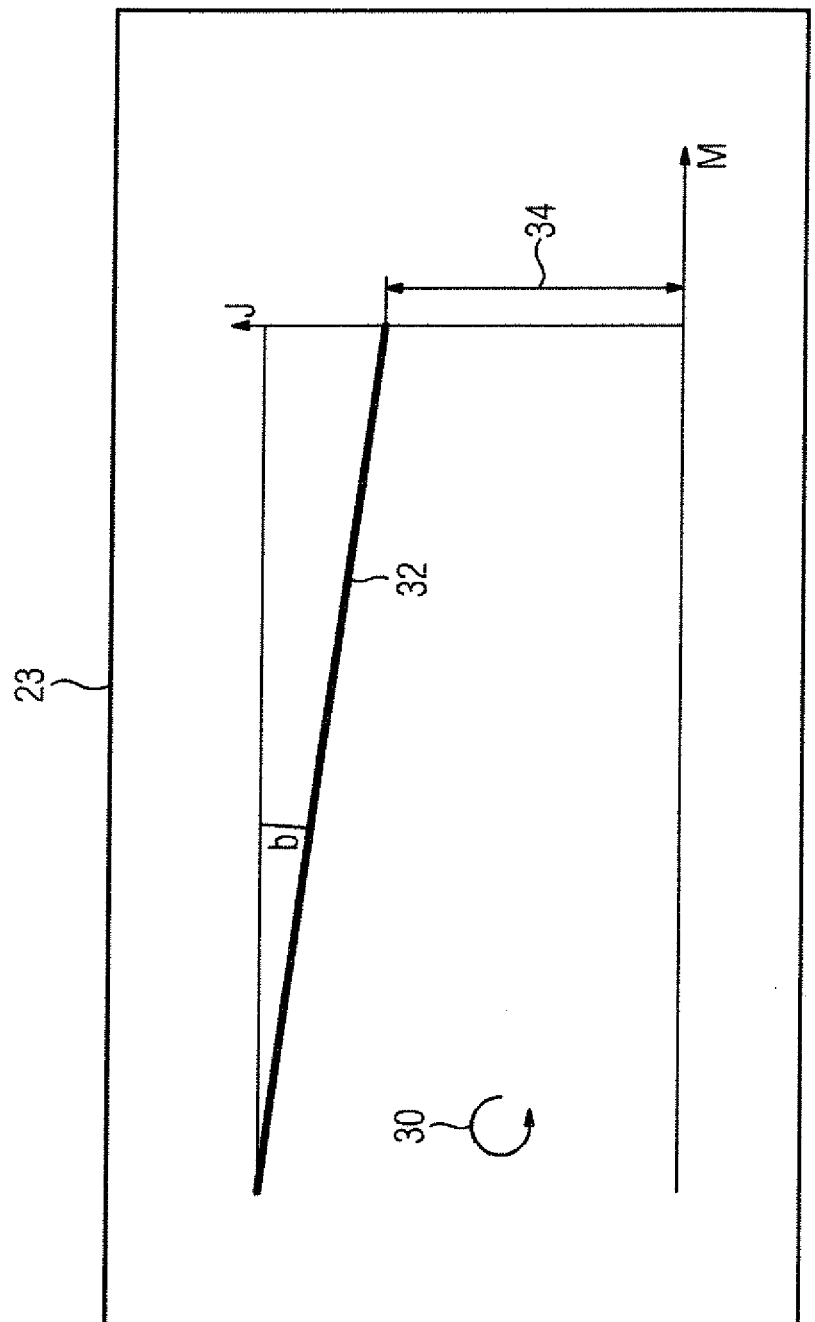
FIG. 3 shows the model in FIG. 2 for a second direction of rotation which is opposite to the first direction of rotation.

FIG. 2 and FIG. 3 show the model 23 again more precisely. FIG. 2 shows the model 23 for a first drive direction 29 or direction of rotation of the drive machine 3, FIG. 3 shows the model 23 for an opposite second drive direction 30 or direction of rotation of the drive machine 3.

The model can have a linear assignment rule 31, 32 for each drive direction 29, 30 in each case. The respective assignment rule 31, 32 can be defined by an offset value 33, 34 and a gradient value a, b. Each assignment rule 31, 32 describes an association between the moment of inertia J and the load moment M.

By way of example it is clear from FIG. 2 how the assignment rule 31 can be formed from a number of value pairs 35. For instance, the assignment rule 31 can be formed by means of the least-squares method as a regression line or regression curve from the value pairs 35. Provision can also be made for the assignment rule 31, 32 to be iteratively adjusted to newly determined value pairs. The gradient value a, b and the offset 33, 34 can be determined from the value pairs by means of a recursive averaging for instance.

The current load moment M is therefore determined by the controller apparatus 2 in a first step with a constant rotational speed, said load moment then being used in a second step during a change in rotational speed to determine the moment of inertia J as an inertia value 28. A value pair 35 is thus produced. The thus determined moment of inertia J is used to improve the control loop in the controller apparatus 2.

Furthermore, the determined moments of inertia J are received in the moment of inertia/load moment characteristic curve, in other words the assignment rule 31, 32. This characteristic curve is then used during the journey at a constant rotational speed for improved estimation of the moment of inertia J. Therefore both constant rotational speeds and also rotational speed ramps can contribute to estimating the current moment of inertia J.

The moment of inertia J can be piloted in the static state (constant rotational speed) from the calculated load moment M, and with a subsequent rotational speed ramp, the rotational speed controller is as a result able to better control the rotational speed.

The function "moment of inertia—load moment", in other words the assignment rules 31, 32, can be not only predetermined statically, but instead also identified and constantly updated during normal operation. To this end, the identified value pairs 35 (current load and calculated moment of inertia 28, as generated by the moment of inertia estimator 27), are used to update the characteristic curve during the acceleration phases, in other words during an increase or decrease in the drive speed.

Overall the example shows how, by means of the invention, an online pilot control of the moment of inertia can be provided with load sensing equipment.

The invention claimed is:

1. A method for operating a controller apparatus for controlling a drive apparatus having a load moment and a moment of inertia, comprising:
   determining an estimated load value of the load moment by a load moment estimator during a constant-running phase, when a drive speed of the drive apparatus is kept to a constant setpoint value by the controller apparatus;
   using a model to describe an association between the moment of inertia and the load moment; and
   generating an estimated inertia value of the moment of inertia as a pilot control of the moment of inertia based on the model during the constant-running phase.

2. The method of claim 1, further comprising parameterizing the pilot control of a torque of the controller apparatus with the estimated inertia value.

3. The method of claim 1, further comprising:
   determining by the controller apparatus an inertia value of the moment of inertia during an acceleration phase, when the drive speed is adjusted to a new setpoint value; and
   adjusting the model by the inertia value.

4. The method of claim 1, wherein the estimated inertia value is generated by the model in a manner dependent on a direction of rotation.

5. The method of claim 1, wherein the model has a linear assignment rule with an offset parameter and a gradient value.

6. The method of claim 1, further comprising adjusting the model during an operation of the drive apparatus based on a number of pairs of a value of a measured or an estimated load value of the load moment and a measured or an estimated inertia value of the moment of inertia.

7. The method of claim 6, further comprising iteratively updating the model based on the pairs of the value.

8. A controller apparatus for controlling a drive apparatus having a moment of inertia and a load moment, comprising:

a signal input for receiving a setpoint value;

a control output for outputting an actuating signal for setting a drive speed of the drive apparatus;

a load moment estimator configured to determine an estimated load value of the load moment; and a model for describing an association between the moment of inertia and the load moment, said controller apparatus being configured to determine the estimated load value of the load moment during a constant-running phase, when a drive speed of the drive apparatus is kept at the setpoint value being constant, to use the model to describe the association between the moment of inertia and the load moment, and to generate an estimated inertia value of the moment of inertia as a pilot control of the moment of inertia based on the model during the constant-running phase.

9. The controller apparatus of claim 8, wherein the model has a linear assignment rule with an offset parameter and a gradient value.

10. A drive apparatus, comprising:

a drive machine having a speed setting device; and a controller apparatus for controlling the drive apparatus having a moment of inertia and a load moment, said controller apparatus including a signal input for receiving a setpoint value, a control output for outputting an actuating signal for setting a drive speed of the drive apparatus, a load moment estimator configured to determine an estimated load value of the load moment and a model for describing an association between the moment of inertia and the load moment, said controller apparatus being configured to determine the estimated load value of the load moment during a constant-running phase, when a drive speed of the drive apparatus is kept at the setpoint value being constant, to use the model to describe the association between the moment of inertia and the load moment, and to generate an estimated inertia value of the moment of inertia as a pilot control of the moment of inertia based on the model during the constant-running phase.

11. The drive apparatus of claim 10, wherein the drive machine is constructed as an electric machine.

12. The drive apparatus of claim 10, further comprising an assembly line for coupling the drive machine, said drive machine being designed to drive the assembly line.

13. The drive apparatus of claim 10, wherein the model has a linear assignment rule with an offset parameter and a gradient value.

* * * * *